United States Patent
Rahardjo et al.

(10) Patent No.: US 10,146,952 B2
(45) Date of Patent: Dec. 4, 2018

(54) SYSTEMS AND METHODS FOR DYNAMIC ROOT OF TRUST MEASUREMENT IN MANAGEMENT CONTROLLER DOMAIN

(71) Applicant: Dell Products L.P., Round Rock, TX (US)

(72) Inventors: Johan Rahardjo, Austin, TX (US); Michael J. Stumpf, Cedar Park, TX (US); Timothy M. Lambert, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 156 days.

(21) Appl. No.: 15/226,280

(22) Filed: Aug. 2, 2016

(65) Prior Publication Data

US 2018/0041543 A1  Feb. 8, 2018

(51) Int. Cl.
*G06F 21/62* (2013.01)
*H04L 29/06* (2006.01)

(52) U.S. Cl.
CPC .......... *G06F 21/6218* (2013.01); *H04L 63/08* (2013.01); *H04L 63/10* (2013.01)

(58) Field of Classification Search
CPC ........ G06F 21/50; G06F 21/51; G06F 21/552; G06F 21/563; G06F 21/565; G06F 21/6218; G06F 21/64; H04L 63/12; H04L 63/123; H04L 63/20; H04L 63/08; H04L 63/10

See application file for complete search history.

(56) References Cited

U.S. PATENT DOCUMENTS

| | | | | |
|---|---|---|---|---|
| 2012/0158890 A1* | 6/2012 | Jreij et al. | ........... | G06F 11/0784 709/217 |
| 2015/0096001 A1* | 4/2015 | Morikuni | ................ | H04L 63/08 726/7 |
| 2016/0283402 A1* | 9/2016 | Schulz | .................. | G06F 12/145 |

* cited by examiner

*Primary Examiner* — Ayoub Alata
(74) *Attorney, Agent, or Firm* — Jackson Walker L.L.P.

(57) ABSTRACT

A method may include, by a program of instructions embodied in a read-only memory of a management controller communicatively coupled to a host system processor of an information handling system and configured to provide management of the information handling system via management traffic communicated between the management controller and a dedicated management network external to the information handling system, performing authenticity checks for each of a plurality of sequentially loaded software components of the management controller and controlling execution of the plurality of software components and access by the software components to one or more information handling resources of the information handling system based on the authenticity checks and a configurable policy associated with the management controller, wherein such control of execution and access permits execution of and access by those software components passing the authenticity checks in the event of failure by at least one of the software components.

15 Claims, 2 Drawing Sheets

SYSTEMS AND METHODS FOR DYNAMIC ROOT OF TRUST MEASUREMENT IN MANAGEMENT CONTROLLER DOMAIN

TECHNICAL FIELD

The present disclosure relates in general to information handling systems, and more particularly to methods and systems for providing improved root of trust measurement in a management controller domain of an information handling system.

In accordance with embodiments of the present disclosure, an information handling system may include a host system comprising a host system processor and a management controller communicatively coupled to the host system processor and configured to provide management of the information handling system via management traffic communicated between the management controller and a dedicated management network external to the information handling system. The management controller may include a processor having a read-only memory embodying a program of instructions configured to, when executed by the processor, perform authenticity checks for each of a plurality of sequentially loaded software components of the management controller and control execution of the plurality of software components and access by the plurality of software components to one or more information handling resources of the information handling system based on the authenticity checks and a configurable policy associated with the management controller, wherein such control of execution and access permits execution of and access by those software components passing the authenticity checks in the event of failure by at least one of the software components.

In accordance with these and other embodiments of the present disclosure, a method may include, by a program of instructions embodied in a read-only memory of a management controller communicatively coupled to a host system processor of an information handling system and configured to provide management of the information handling system via management traffic communicated between the management controller and a dedicated management network external to the information handling system, performing authenticity checks for each of a plurality of sequentially loaded software components of the management controller and controlling execution of the plurality of software components and access by the plurality of software components to one or more information handling resources of the information handling system based on the authenticity checks and a configurable policy associated with the management controller, wherein such control of execution and access permits execution of and access by those software components passing the authenticity checks in the event of failure by at least one of the software components.

In accordance with these and other embodiments of the present disclosure, an article of manufacture may include a non-transitory read-only computer-readable medium and computer-executable instructions carried on the computer-readable medium, the instructions readable by a processor, the computer-readable medium integral to the processor. The instructions, when read and executed, may cause the processor to perform authenticity checks for each of a plurality of sequentially loaded software components of a management controller communicatively coupled to a host system processor of an information handling system and configured to provide management of the information handling system via management traffic communicated between the management controller and a dedicated management network external to the information handling system and control execution of the plurality of software components and access by the plurality of software components to one or more information handling resources of the information handling system based on the authenticity checks and a configurable policy associated with the management controller, wherein such control of execution and access permits execution of and access by those software components passing the authenticity checks in the event of failure by at least one of the software components.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often include management controllers for out of band management of such information handling systems. In traditional approaches, the root of trust for executable code on the management controller is often based on a serial chain of trust, whereby a first software component provides the root of trust for a second software component, the second software component provides the root of trust for a third software component, and so on. Such serial chain of trust is often fragile, as trust for a software component may come from another software component which has been compromised.

SUMMARY

In accordance with the teachings of the present disclosure, the disadvantages and problems associated with existing approaches for providing root of trust for a management controller of an information handling system may be reduced or eliminated.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
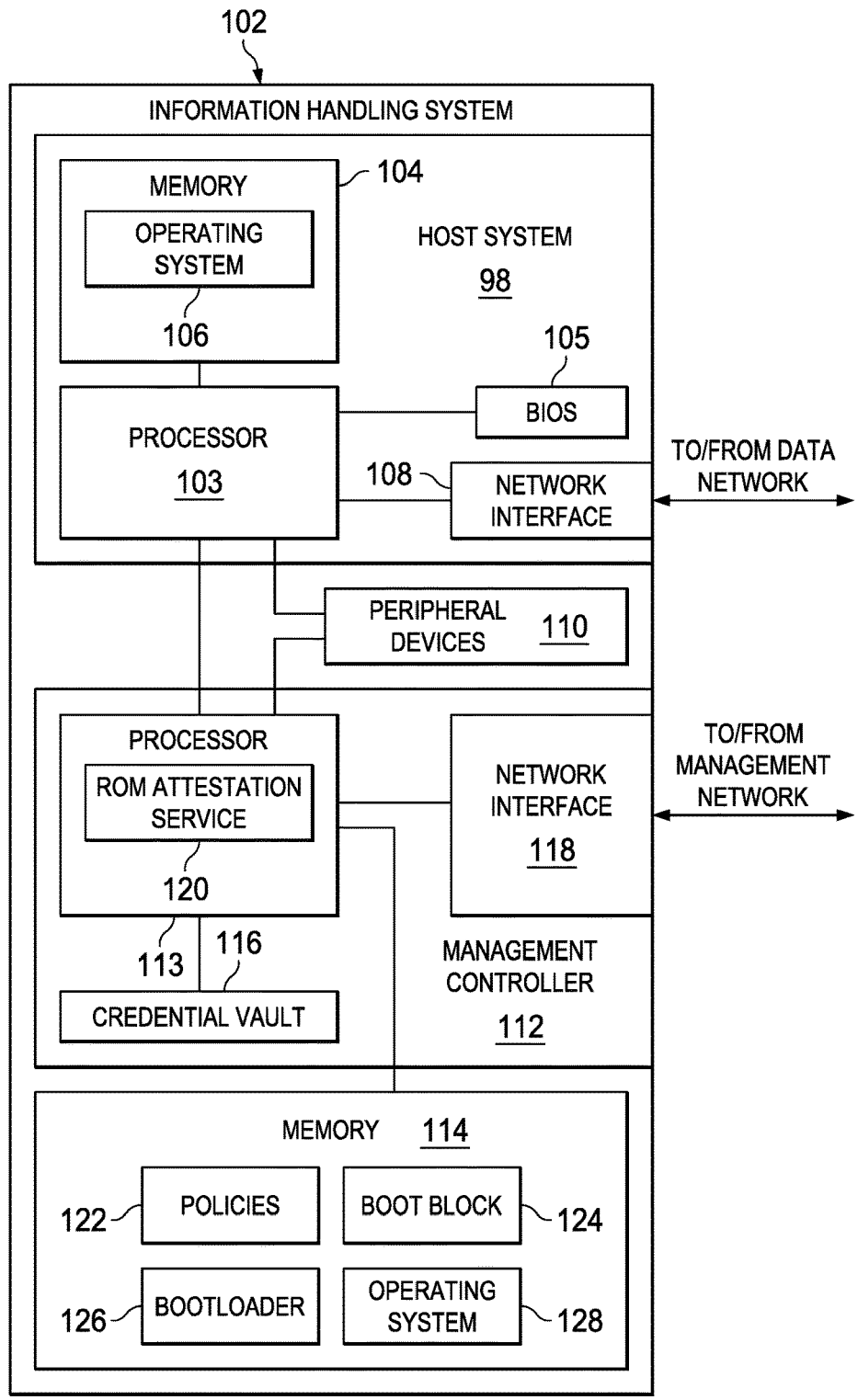
FIG. 1 illustrates a block diagram of an example information handling system, in accordance with embodiments of the present disclosure.
Figure 2:
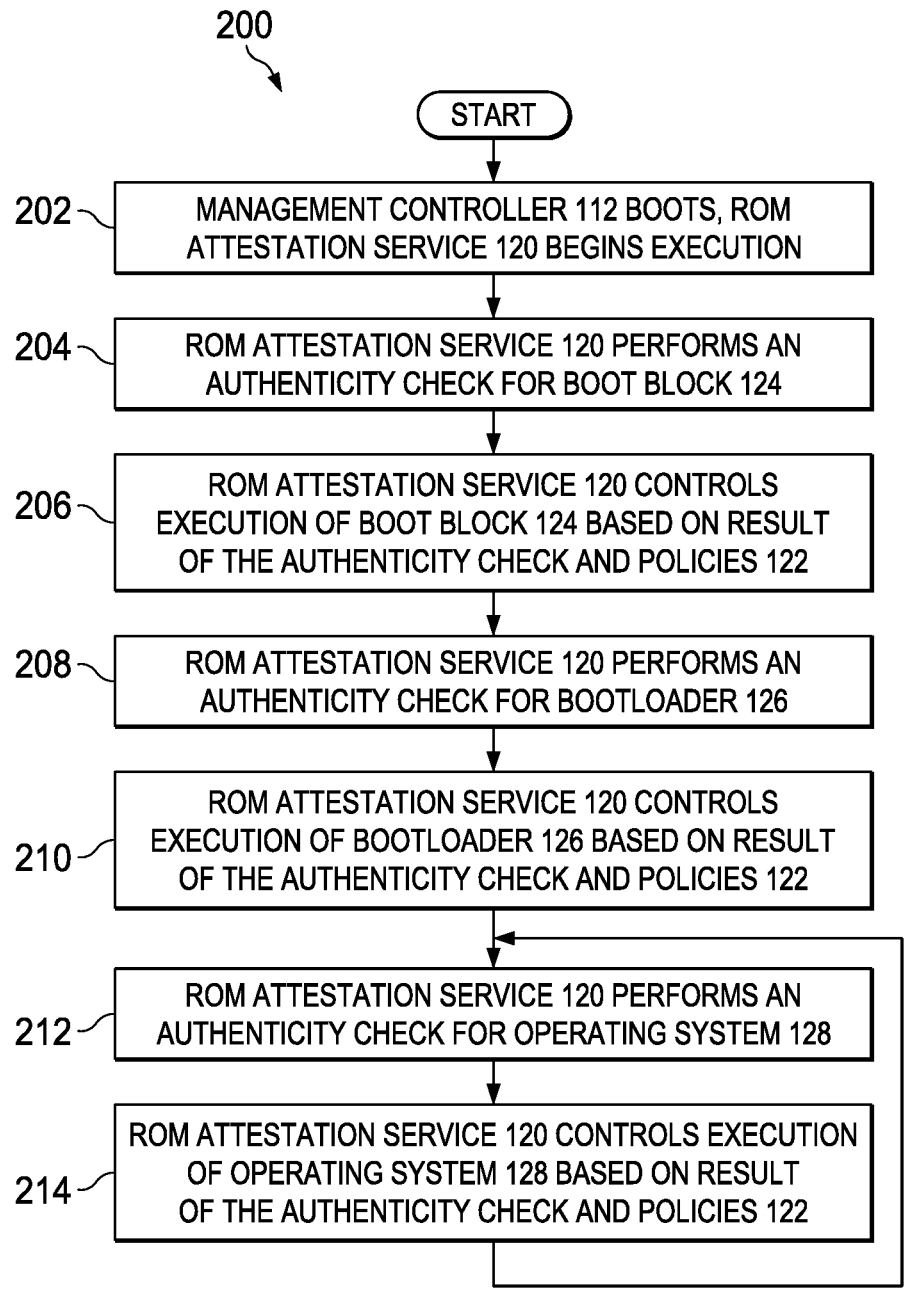
FIG. 2 illustrates a flowchart of an example method for providing dynamic root of trust in a management controller domain of an information handling system, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, a network interface 108 communicatively coupled to processor 103, one or more peripheral devices 110 communicatively coupled to processor 103, and a management controller 112 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Network interface 108 may comprise any suitable system, apparatus, or device operable to serve as an interface between information handling system 102 and one or more other information handling systems via an in-band management network. Network interface 108 may enable information handling system 102 to communicate using any suitable transmission protocol and/or standard. In these and other embodiments, network interface 108 may comprise a network interface card, or "NIC." In some embodiments, network interface 108 may comprise a 10 gigabit Ethernet network interface. In these and other embodiments, network interface 108 may be enabled as a local area network (LAN)-on-motherboard (LOM) card.

In operation, processor 103, memory 104, BIOS 105, and network interface 108 may comprise at least a portion of a host system 98 of information handling system 102.

One or more peripheral devices 116 may be communicatively coupled to processor 103 and processor 113 of management controller 112 and may generally include any information handling resource. A peripheral device 116 may also be coupled to processor 103 and/or processor 113 via an inter-integrated circuit (I2C) bus and/or via a PCIe bus.

Management controller 112 may be configured to provide management facilities for management of information handling system 102. Such management may be made by management controller 112 even if information handling system 102 is powered off or powered to a standby state. Management controller 112 may include a processor 113, memory, and a management network interface 118 separate from and physically isolated from data network interface 108. In certain embodiments, management controller 112 may include or may be an integral part of a baseboard management controller (BMC) or a remote access controller (e.g., a Dell Remote Access Controller or Integrated Dell Remote Access Controller). As shown in FIG. 1, management controller 112 may comprise a processor 113, a memory communicatively coupled to processor 113, a credential vault 116 communicatively coupled to processor 113, and a network interface 118 communicatively coupled to processor 113.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in a memory and/or another component of information handling system 102 or management controller 112. As shown in FIG. 1, processor 113 may be communicatively coupled to processor 103. Such coupling may be via a Universal Serial Bus (USB), System Management Bus (SMBus), and/or one or more other communications channels.

As shown in FIG. 1, processor 113 may include ROM attestation service 120. ROM attestation service 120 may comprise any program of executable instructions, or aggregation of programs of executable instructions, embodied in read-only memory (ROM) integral to processor 113 and configured to provide centralized, hardware-based dynamic attestation of software components of management controller 112, as described in greater detail elsewhere in this disclosure.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off. Memory 114 may have stored thereon software and/or firmware which may be read and executed by processor 113 for carrying out the functionality of management controller 112. For example, as shown in FIG. 1, memory 114 may have stored thereon software components including boot block 124, bootloader 126, and operating system 128. As shown in FIG. 1, memory 114 may also have stored thereon policies 122 for the dynamic root of trust provided by ROM attestation service 120.

Boot block 124 (which may also be referred to as a boot sector) may include any program of instructions stored within a particular region of memory 114 that includes machine code to be loaded and executed by processor 113 in order to facilitate loading and execution by processor 113 of operating system 128. Although boot block 124 is shown in FIG. 1 as stored in memory 114, in some embodiments boot block 124 may be stored in storage media accessible to processor 113, and active portions of boot block 124 may be transferred from such storage media to memory 114 for execution by processor 113.

Boot block 124 (which may also be referred to as a boot sector) may include any program of instructions stored within a particular region of memory 114 that includes machine code to be loaded and executed by processor 113 in order to facilitate loading and execution by processor 113 of bootloader 126. Although boot block 124 is shown in FIG. 1 as stored in memory 114, in some embodiments boot block 124 may be stored in storage media accessible to processor 113, and active portions of boot block 124 may be transferred from such storage media to memory 114 for execution by processor 113.

Bootloader 126 may include any program of instructions configured to load other data and programs (including operating system 128) into RAM which are then executed by processor 113 in order to carry out the functionality of management controller 112. In some embodiments, bootloader 126 may comprise Das U-boot, which may also be known as Universal Bootloader or simply "uboot." Although bootloader 126 is shown in FIG. 1 as stored in memory 114, in some embodiments bootloader 126 may be stored in storage media accessible to processor 113, and active portions of bootloader 126 may be transferred from such storage media to memory 114 for execution by processor 113.

Operating system 128 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 128, in order for carrying out the functionality of management controller 112. In addition, operating system 128 may include all or a portion of a network stack for network communication via a network interface (e.g., network interface 118 for communication over an out-of-band management network). Active portions of operating system 128 may be transferred to memory 114 for execution by processor 113. Although operating system 128 is shown in FIG. 1 as stored in memory 114, in some embodiments operating system 106 may be stored in storage media accessible to processor 113, and active portions of operating system 128 may be transferred from such storage media to memory 114 for execution by processor 113.

Policies 122 may comprise a list, database, map, table, or other suitable data structure configurable by an administrator of information handling system 102 and defining a set of rules applicable to the dynamic root of trust provided by ROM attestation service 120, as described elsewhere in this disclosure. In some embodiments, an administrator may access, set, and/or modify policies 122 via an interface provided by BIOS 105. In some of such embodiments, policies 122 may be stored on a computer-readable medium external to management controller 112 (e.g., not integral to management controller 112, as shown in FIG. 1). As described elsewhere, such policies 122 may allow an administrator to adapt trust settings to trade off between uptime and security of information handling system 102 (e.g., increase security by limiting execution if certain components fail authenticity checks, or increase uptime by allowing execution of certain components when authenticity checks fail). For example, a policy may define handling in response to corruptions within different portions of an operating system 128, as determined by ROM attestation service 120. As specific examples, policies 122 may dictate that for: (i) corruptions in highly-critical portions of operating system 128 (e.g., base tools, monitoring, or management portions of operating system 128), execution of management controller 112 and/or information handling system 102 may be halted; (ii) corruptions in medium-critical portions of operating system 128 (e.g., a webserver), execution of management controller 112 and/or information handling system 102 may be permitted to continue but without access to credential vault 116; and (iii) corruptions in low-critical portions of operating system 128 (e.g., a life-cycle controller), execution of management controller 112 and/or information handling system 102 may be permitted to continue with management controller 112 having access to credential vault 116, with an alert communicated to the administrator.

Credential vault 116 may comprise a database or any other suitable data structure stored in computer-readable media integral to or otherwise accessible to processor 113, and may be used to store passwords, digital certificates, and similar cryptographic key material. For example, data stored in credential vault 116 may comprise current and historical passwords to privileged accounts. In some embodiments, all passwords and keys may be encrypted, to protect against disclosure to an attacker who has compromised the physical storage media where credentials are stored or backed up. Access to contents of credential vault 116 is often subject to access controls, so that different (authenticated) users are able to fetch different sets of passwords or keys. Accordingly, credential vault 116 may only be accessible in connection with a hardware-verified boot.

Network interface 118 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." In some embodiments, network interface 118 may comprise a 1 gigabit Ethernet network interface.

In addition to processor 103, memory 104, network interface 108, and management controller 112, information handling system 102 may include one or more other information handling resources.

In operation, as described below, ROM attestation service 120 may perform all authenticity checks of critical components of management controller 112 (e.g., boot block 124, bootloader 126, and operating system 128), and control access to credential vault 116 based on results of such authenticity checks and settings within policies 122. Because ROM attestation service 120 is embodied in unchangeable ROM code integral to processor 113, ROM attestation service 120 may be implicitly trusted. Credential vault 116 may be closed by default, and may only be opened and accessed by ROM attestation service 120 when policies 122 allow, thus rendering credential vault 116 more secure as compared to traditional security approaches.

FIG. 2 illustrates a flowchart of an example method 200 for providing dynamic root of trust in a management controller domain of an information handling system, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, management controller 112 may boot and ROM attestation service 120 may begin execution. At step 204, ROM attestation service 120 may perform an authenticity check for boot block 124 (e.g., by comparing a hash or identifier stored in ROM attestation service 120 to a hash or identifier generated from the code for boot block 124). At step 206, ROM attestation service 120 may control execution of boot block 124 based on the result of the authenticity check and policies 122.

At step 208, boot block 124 may request ROM attestation service 120 to perform an authenticity check for bootloader 126 and ROM attestation service 120 may perform such authenticity check (e.g., by comparing a hash or identifier stored in ROM attestation service 120 to a hash or identifier generated from the code for bootloader 126). At step 210, ROM attestation service 120 may control execution of bootloader 126 based on the result of the authenticity check and policies 122.

At step 212, bootloader 126 may request ROM attestation service 120 to perform an authenticity check for operating system 128 and ROM attestation service 120 may perform such authenticity check (e.g., by comparing a hash or identifier stored in ROM attestation service 120 to a hash or identifier generated from the code for operating system 128). At step 214, ROM attestation service 120 may control execution of operating system 128 based on the result of the authenticity check and policies 122. After completion of step 214, method 200 may return to step 212, and steps 212 and 214 may be repeated over and over again on a periodic basis in order to prevent run-time exploits of operating system 128.

Although FIG. 2 discloses a particular number of steps to be taken with respect to method 200, it may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

The centralized ROM attestation service 120 may provide numerous advantages over traditional approaches. For example, the methods and systems herein may provide greater resiliency in the event that an authenticity check of a component fails. In a traditional serial chain of trust model, typically the only response to a failure of an authenticity check is to halt execution. However, with the dynamic chain of trust provided by ROM attestation service 120, all critical code components for management controller 112 may be verified by implicitly trusted ROM code of ROM attestation service 120. Accordingly, based on authenticity checks and policies 122, ROM attestation service 120 may make a decision whether to halt or continue execution, and if continuing execution, what limits to place on execution (e.g., restricted access to credential vault 116 and/or peripheral devices) by a component. Thus, a halt in execution may no longer be needed to guarantee security, and an administrator may choose to execute untrusted code in order to get to trusted code. To illustrate, assume that during execution of method 200 above, boot block 124 passes its authenticity check, but bootloader 126 fails its authenticity check. Assume further that policies 122 are set by an administrator to allow bootloader 126 to continue executing despite the failed authenticity check, but with credential vault 116 locked from access by bootloader 126. Subsequently, operating system 128 may pass its authenticity check and begin execution, and at some time during execution, issue a request to ROM attestation service 120 to access credential vault 116. Because operating system 128 is trusted, ROM attestation service 120 may unlock credential vault 116 to allow access by operating system 128, but may limit such access for a period of time (e.g., 100 seconds).

Another advantage of the systems and methods disclosed herein is that ROM attestation service 120 maintains a smaller "attack surface" than that of traditional approach. In standard serial chain of trust approaches, the attack surface is large, and any break in trusted code is a breach. However, the ROM attestation service 120 disclosed herein limits the attack surface.

Yet another advantage of the systems and methods disclosed herein is that ROM attestation service 120 provides for granular security not available in traditional approaches. For example, events that would result in a break in the chain of trust using traditional approaches may not compromise operating system 128. In the event that an attacker replaces operating system 128 with a doppleganger, a user/administrator would know, as credential vault 116 would remain inaccessible. In addition, per user policy, access to peripheral devices 110 may be limited/disabled per policies 122, thus further preventing intrusion.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a host system comprising a host system processor; and
   a management controller communicatively coupled to the host system processor and configured to provide management of the information handling system via management traffic communicated between the management controller and a dedicated management network external to the information handling system, the management controller comprising a processor having a read-only memory embodying a program of instructions configured to, when executed by the processor:
   perform authenticity checks for each of a plurality of sequentially loaded software components of the management controller; and
   control execution of the plurality of software components and access by the plurality of software components to one or more information handling resources of the information handling system based on the authenticity checks and a configurable policy associated with the management controller, the one or more information handling resources including a credential vault of the management controller, wherein such control of execution and access includes: in response to a first software component failing the authenticity checks and a second software component passing the authenticity checks, executing the first software component such that the first software component does not have access to the credential vault, and allowing access to the credential vault for a selected period of time by the second software component.

2. The information handling system of claim 1, wherein the plurality of software components comprises a boot block, a bootloader, and an operating system.

3. The information handling system of claim 1, wherein the one or more information handling resources of the information handling system comprise a peripheral device of the information handling system.

4. The information handling system of claim 3, further wherein controlling execution of the plurality of software components and access to the peripheral device comprises restricting access to the credential vault by those software components failing the authenticity checks but allowing access to the credential vault by those software components passing the authenticity checks.

5. The information handling system of claim 1, wherein the management controller comprises a baseboard management controller.

6. A method comprising, by a program of instructions embodied in a read-only memory of a management controller communicatively coupled to a host system processor of an information handling system and configured to provide management of the information handling system via management traffic communicated between the management controller and a dedicated management network external to the information handling system:
   performing authenticity checks for each of a plurality of sequentially loaded software components of the management controller; and
   controlling execution of the plurality of software components and access by the plurality of software components to one or more information handling resources of the information handling system based on the authenticity checks and a configurable policy associated with the management controller, the one or more information handling resources including a credential vault of the management controller, wherein such control of execution and access includes: in response to a first software component failing the authenticity checks and a second software component passing the authenticity checks, executing the first software component such that the first software component does not have access to the credential vault, and allowing access to the credential vault for a selected period of time by the second software component.

7. The method of claim 6, wherein the plurality of software components comprises a boot block, a bootloader, and an operating system.

8. The method of claim 6, wherein the one or more information handling resources of the information handling system comprise a peripheral device of the information handling system.

9. The method of claim 8, further wherein controlling execution of the plurality of software components and access to the peripheral device comprises restricting access to the credential vault by those software components failing the authenticity checks but allowing access to the credential vault by those software components passing the authenticity checks.

10. The method of claim 6, wherein the management controller comprises a baseboard management controller.

11. An article of manufacture comprising:
   a non-transitory read-only computer-readable medium; and
   computer-executable instructions carried on the computer-readable medium, the instructions readable by a processor, the computer-readable medium integral to the processor, and the instructions, when read and executed, for causing the processor to:
      perform authenticity checks for each of a plurality of sequentially loaded software components of a management controller communicatively coupled to a host system processor of an information handling system and configured to provide management of the information handling system via management traffic communicated between the management controller and a dedicated management network external to the information handling system; and
      control execution of the plurality of software components and access by the plurality of software components to one or more information handling resources of the information handling system based on the authenticity checks and a configurable policy associated with the management controller, the one or more information handling resources including a peripheral device of the management controller, wherein such control of execution and access includes: in response to a first software component failing the authenticity checks and a second software component passing the authenticity checks, executing the first software component such that the first software component does not have access to the peripheral device, and allowing access to the peripheral device for a selected period of time by the second software component.

12. The article of claim 11, wherein the plurality of software components comprises a boot block, a bootloader, and an operating system.

13. The article of claim 11, wherein the one or more information handling resources of the information handling system comprise a credential vault of the management controller.

14. The article of claim 13, further wherein controlling execution of the plurality of software components and access to the credential vault comprises restricting access to the credential vault by those software components failing the authenticity checks but allowing access to the credential vault by those software components passing the authenticity checks.

15. The article of claim 11, wherein the management controller comprises a baseboard management controller.

* * * * *